United States Patent
Dobisz et al.

(10) Patent No.: US 8,546,001 B2
(45) Date of Patent: Oct. 1, 2013

(54) FABRICATING MAGNETIC RECORDING MEDIA ON PATTERNED SEED LAYERS

(75) Inventors: Elizabeth Dobisz, San Jose, CA (US); David Margulies, Salinas, CA (US); Olav Hellwig, San Jose, CA (US); Xiao Z. Wu, San Jose, CA (US)

(73) Assignee: HGST Netherlands, B.V., Amsterdam (NL)

( * ) Notice: Subject to any disclaimer, the term of this patent is extended or adjusted under 35 U.S.C. 154(b) by 0 days.

(21) Appl. No.: 12/827,080

(22) Filed: Jun. 30, 2010

(65) Prior Publication Data

US 2010/0273028 A1 Oct. 28, 2010

Related U.S. Application Data

(62) Division of application No. 11/850,165, filed on Sep. 5, 2007, now Pat. No. 7,776,388.

(51) Int. Cl.
*G11B 5/66* (2006.01)
*B05D 5/12* (2006.01)

(52) U.S. Cl.
USPC .............................. 428/832; 427/131; 216/41

(58) Field of Classification Search
None
See application file for complete search history.

(56) References Cited

U.S. PATENT DOCUMENTS

| | | | | |
|---|---|---|---|---|
| 6,180,208 B1 * | 1/2001 | Shiratori et al. | ............... | 428/141 |
| 8,003,163 B2 * | 8/2011 | Lee et al. | ....................... | 427/128 |
| 2005/0214520 A1 * | 9/2005 | Oikawa et al. | ................ | 428/323 |
| 2005/0255337 A1 * | 11/2005 | Mukai | ............ | 428/831 |
| 2007/0218318 A1 * | 9/2007 | Watanabe | ...................... | 428/832 |
| 2007/0224455 A1 * | 9/2007 | Iida et al. | ................... | 428/831.2 |

* cited by examiner

*Primary Examiner* — Holly Rickman
(74) *Attorney, Agent, or Firm* — Duft Bornsen & Fettig, LLP (57) ABSTRACT

Patterned media and associated methods of fabrication are provided in which vertical magnetic grains are grown on a patterned seed layer. The patterned seed layer includes a matrix of islands of a first seed material. Each island of first seed material is separated from other islands by a region of second seed material. The first seed material is selected to initiate growth of magnetic material, and the second seed material is selected to initiate growth of non-magnetic material. Subsequently, magnetic material is grown on the first seed material and non-magnetic material is grown on the second seed material. Deposition may be simultaneously. The magnetic and non-magnetic materials form well-defined vertical columns over the first and second seed materials respectively. Thus, each island behaves as an isolated magnetic unit, which switches independently from its neighbor units, which are magnetically separated by the non-magnetic material.

12 Claims, 12 Drawing Sheets

FABRICATING MAGNETIC RECORDING MEDIA ON PATTERNED SEED LAYERS

RELATED APPLICATIONS

The patent application is a divisional of a U.S. patent application having the Ser. No. 11/850,165, and filed on Sep. 5, 2007, now U.S. Pat. No. 7,776,388 which is incorporated by reference herein.

BACKGROUND OF THE INVENTION

1. Field of the Invention

The invention is related to the field of magnetic recording disk drive systems and, in particular, to fabricating patterned media by growing laterally ordered arrays of vertical magnetic grains of a recording layer on patterned seed layers.

2. Statement of the Problem

Magnetic hard disk drive systems typically include a magnetic disk, a recording head having write and read elements, a suspension arm, and an actuator arm. As the magnetic disk is rotated, air adjacent to the disk surface moves with the disk. This allows the recording head (also referred to as a slider) to fly on an extremely thin cushion of air, generally referred to as an air bearing. When the recording head flies on the air bearing, the actuator arm swings the suspension arm to place the recording head over selected circular tracks on the rotating magnetic disk where signal fields are written to and read by the write and read elements, respectively. The write and read elements are connected to processing circuitry that operates according to a computer program to implement write and read functions.

In a disk drive utilizing perpendicular recording, data is recorded on a magnetic recording disk by magnetizing the recording layer in a direction perpendicular to the surface of the disk. Typically, the recording layer is a continuous thin film of a magnetic alloy, which naturally forms a random mosaic of nanometer-scale grains, which behave as quasi-independent magnetic elements. As a result, grain boundaries don't always correspond with bit transition boundaries, thus creating an increased noise level. One solution has been to fabricate smaller magnetic grains such that the magnetic transitions between bits become relatively straighter. However, present disk drive technology is reaching its physical limit for recording capacity, because further shrinking the magnetic grain sizes can cause un-stability in their magnetization due to thermal excitations at room temperature, known as the superparamagnetic effect.

Patterned media is one of the solutions which can circumvent the density limitations imposed by the superparamagnetic effect. In patterned media, the magnetic recording layer is created as an ordered array of pre-defined highly uniform islands or cells, each island capable of storing an individual bit. In order to take advantage of patterned media, write synchronization between the write head position and the position of the islands is necessary. While patterned media delays the onset of superparamagnetism, its cost competitive mass fabrication has proved to be challenging. One approach to fabricate patterned media involves depositing the magnetic recording layer onto a substrate, and subsequently patterning the magnetic recording layer. The magnetic recording layer is initially a continuous film, which is then covered with a resist material, and the dimensions of the magnetic islands and trenches separating the magnetic islands are defined using a lithographic process. As a result, flyability is a problem because the finished media has topographical features that affect the aerodynamics of the read/write head. Therefore, additional processes must be performed to planarize the media. A further problem is that it is difficult to use reactive-ion-etching (RIE) to remove portions of the magnetic layer without affecting the magnetism of the remaining magnetic islands (e.g., causing softening, loss of magnetic moment, etc.). While an ion-beam process can be utilized to remove portions of the magnetic layer, this approach is typically too costly for large-scale manufacturing.

A second fabrication approach involves depositing the magnetic recording layer onto a pre-patterned substrate. The pre-patterned substrate defines the islands and trenches, and the magnetic materials cover both the islands and trenches. This approach avoids the difficulty of patterning the magnetic layer itself, but still has the common problem of flyability, and a subsequent planarization process is needed. Additionally, the magnetic material in the trenches creates undesired stray fields, which contribute to high background noise levels during the read back process. Further more, material deposited onto the sidewalls of the islands may cause coupling of adjacent islands to each other via the trenches. Further problems with this fabrication method include uncontrolled overgrowth effects and reduced magnetism due to curving of the media layers at the edge of the islands.

SUMMARY OF THE SOLUTION

Embodiments of the invention solve the above and other related problems with patterned media and associated methods of fabrication in which vertical magnetic grains are grown on a patterned seed layer. The patterned seed layer includes a matrix of islands of a first seed material. Each island of first seed material is separated from other islands by a region of second seed material. The first seed material is selected to initiate growth of magnetic material, and the second seed material is selected to initiate growth of non-magnetic material. Subsequently, magnetic material is grown on the first seed material, and non-magnetic material is grown on the second seed material. This can be a single simultaneous deposition (from one target or co-deposition from several targets), in which the magnetic/non-magnetic regions form in a self organized way similar to conventional perpendicular recording media fabrication. The magnetic and non-magnetic materials form well-defined vertical columns over the first and second seed materials respectively. Thus, each island behaves as an isolated magnetic unit and switches independently from its neighbor units, which are magnetically separated by the non-magnetic material.

This type of patterned media fabrication offers several advantages. One advantage is that there are no large topographical differences between the magnetic islands and the non-magnetic regions. Thus, there is no need for subsequent planarization processes. Another advantage is that there is no disturbance of the magnetic signal from the non-magnetic regions that isolate and decouple adjacent magnetic cells. Therefore, no additional processes are needed to remove trench material, either physically or magnetically. Further, it is advantageous to have no additional process steps after the magnetic layer deposition, which could damage the delicate magnetic recording layer on top of the islands. Because a very thin (1 nm to 3 nm) seed layer can be utilized, overgrowth and edge effects can be minimized or avoided. Because the non-magnetic boundaries can be very thin, patterned media fabricated according to this method has a greater effective area contributing to a bit signal compared with other patterned media fabricated according to previous methods. Thus, the utilization factor of the patterned media compares favorably with the density of continuous perpendicular magnetic recording media.

One embodiment of the invention comprises a method for fabricating patterned media. The method comprises forming a patterned seed layer including first and second seed materials. The patterned seed layer may be formed using a lithographic process, such that a matrix of islands of first seed material is formed. For example, a layer of first seed material may be deposited and covered with a patterned resist layer, and an etching process may be performed to remove portions of the layer of first seed material and define islands or cells. A layer of second seed material may be deposited over the patterned media, and the resist layer may be removed, leaving the patterned seed layer comprising a matrix of islands of first seed material separated by regions of second seed material. Alternatively, the order of deposition of the first and second seed materials may be reversed, which results in the fabrication of a similar patterned seed layer. The method further comprises growing magnetic material on the first seed material and growing non-magnetic material on the second seed material. The magnetic and non-magnetic material may be grown simultaneously using a sputtering process similar as used in conventional continuous perpendicular media. As a result, the magnetic material forms vertical columns on the first seed material, and the non-magnetic material forms vertical columns on the second seed material, thus filling the boundaries in between magnetic regions with non-magnetic material.

Another embodiment of the invention comprises a method for fabricating a magnetic storage media, such as a continuous perpendicular magnetic recording media. The method comprises forming a seed layer, and patterning the seed layer to form topographically distinct regions of the seed layer. The boundary between two topographically distinct regions forms a bit transition. The method further comprises growing magnetic material on the seed layer. As a result of the topographically distinct regions, the growth of the magnetic material is controlled such that magnetic material grows within the boundaries of a single bit rather than randomly growing on the media. Advantageously, magnetic grains don't cross bit transition boundaries, providing a higher areal density and a better signal to noise ratio by lining up the grains at the bit boundaries. For both techniques write synchronization between the position of the write head and the position of the pre-defined bits is advantageous to fully utilize the advantages of the invention.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-28 and the following description depict specific exemplary embodiments of the invention to teach those skilled in the art how to make and use the invention. For the purpose of teaching inventive principles, some conventional aspects of the invention have been simplified or omitted. The lithographic patterns can be written in either negative tone or positive tone resists. Image reversal techniques, such as liftoff of a disposable hard mask will be obvious to one skilled in the art of lithographic fabrication. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
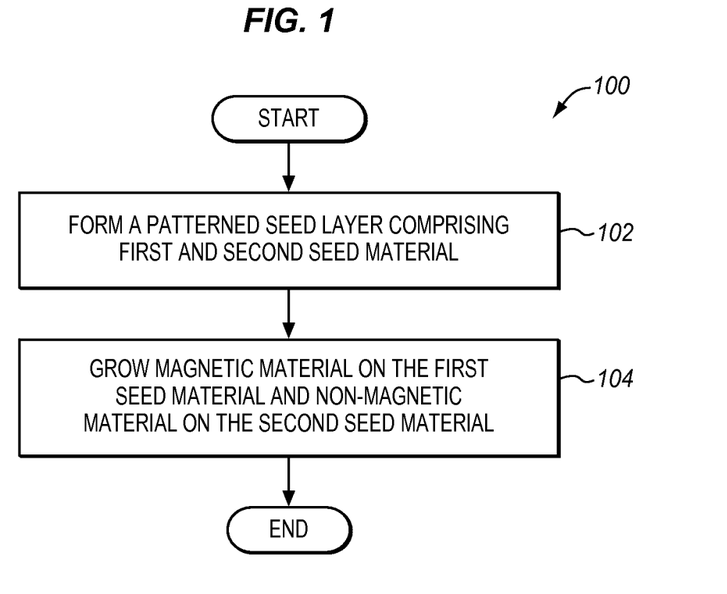
FIG. 1 illustrates a flow chart of a general method for fabricating patterned media in an exemplary embodiment of the invention.
Figure 2:
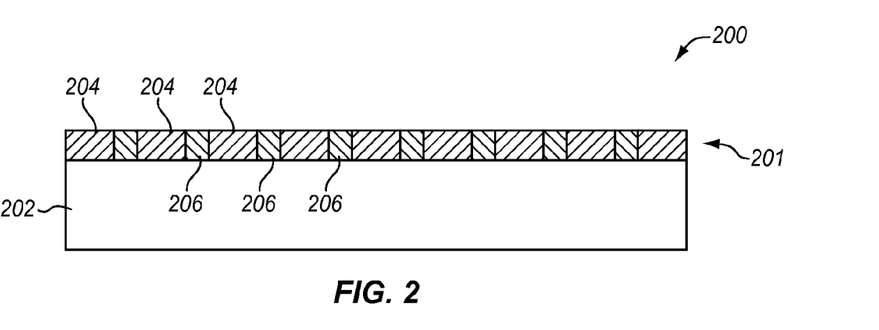
FIGS. 2 and 4 illustrate cross sectional and top views of the patterned seed layer, respectively, in exemplary embodiments of the invention.
Figure 3:
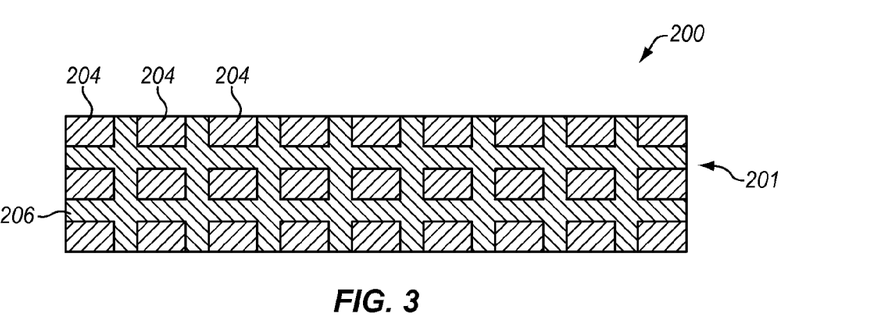
FIG. 3 illustrates the patterned media grown by the method of FIG. 1 in an exemplary embodiment of the invention.
Figure 4:
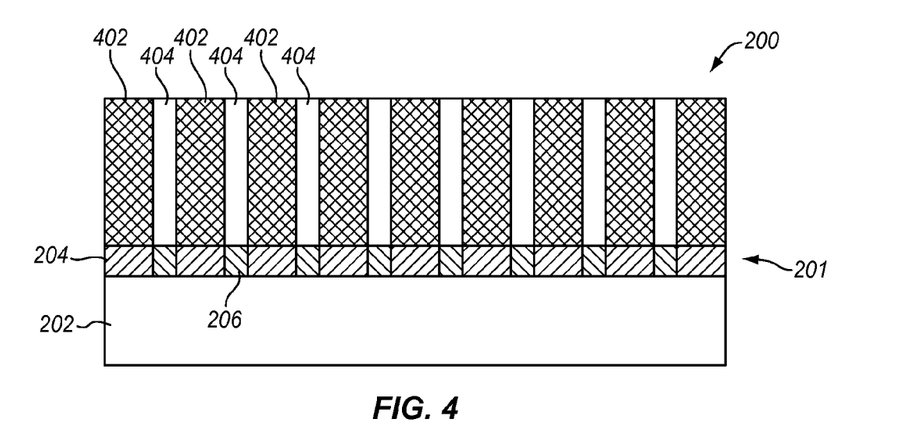

FIG. 1 illustrates a flow chart of a method 100 for fabricating patterned media in an exemplary embodiment of the invention. FIGS. 2 and 4 illustrate cross sectional views, and FIG. 3 illustrates a top view of patterned media 200 during fabrication according to method 100 of FIG. 1 in exemplary embodiments of the invention, and the steps of method 100 are described in reference to patterned media 200 of FIGS. 2-4. The steps of method 100 may not be all-inclusive, and may include other steps not shown for the sake of brevity.

Step 102 comprises forming a laterally patterned seed layer 201 over a substrate 202 (see FIG. 2). Patterned seed layer 201 comprises first seed material 204 and second seed material 206. Patterned seed layer 201 may form a matrix of islands (or cells) of a first seed material 204.

As used herein, a matrix of islands comprises a structure resembling an array with columns and rows. Each island of first seed material 204 is separated from other islands by a region of second seed material 206. First seed material 204 and second seed material 206 may differ in a) chemistry or composition, b) crystalline structure, c) small height differences (1-3 nm)). A variety of shapes of magnetic islands may be utilized. For example, islands may be round, square, rectangular, oval arcs, or other lithographically defined patterns. The islands can be arrayed in a variety of spacing and predetermined arrays. The array can vary across the substrate. Further, the array is lithographically determined, for example by density multiplication techniques such as self-assembly or by sidewall deposition.

First seed material 204 is selected to initiate growth of subsequently formed magnetic material. Second seed material 206 is selected to initiate growth of subsequently formed non-magnetic material. For example, first seed material 204 may be selected so that a crystalline magnetic phase naturally prefers growing on the predefined islands or cells of first seed material 204 (e.g., may be Ru), while second seed material 206 may be selected so that an amorphous non-magnetic phase prefers growing on a region in between the islands (e.g., may be TaOx or SiOx).

As used herein phase refers to a distinct state of matter in a system. More particularly, phase refers to matter that is identical in chemical composition and physical state and separated from others materials by a phase boundary. A phase may be a set of states of a macroscopic physical system that have a relatively uniform chemical composition and physical properties, such as density, crystal structure, index of refraction, etc.)

Patterned seed layer 201 may be formed using a lithographic process. The resulting structure of patterned media 200 after completion of step 102 is illustrated in FIG. 2. FIG. 3 illustrates a top view of patterned media 200 after completion of step 102.

Step 104 comprises simultaneously growing magnetic material 402 (see FIG. 4) on first seed material 204 and growing non-magnetic material 404 (see FIG. 4) on second seed material 206. Magnetic material 402 and non-magnetic material 404 form well defined columns over first seed material 204 and second seed material 206 respectively. Thus, islands or cells of magnetic material 402 are formed over the islands of first seed material 204. Even though there may be multiple crystalline domains within an island, they are strongly coupled within the island to behave as a single independent magnetic domain. Each domain switches independently from its neighbor units, which are magnetically separated by non-magnetic material 404. The resulting structure of patterned media 200 after completion of step 104 is illustrated in FIG. 4.

Thus, patterned media 200 comprises a magnetic recording layer, which is patterned in a matrix. Advantageously, there are no large topographical differences between an island of magnetic material 402 and regions of non-magnetic materials 404. Therefore, there is no need for subsequent planarization processes. Further, there is no disturbance of the magnetic signal from regions of non-magnetic material 404 that isolate and decouple adjacent islands of magnetic material 402, and no additional processes are needed to remove the trench material, either physically or magnetically. Otherwise, additional process steps after the deposition of magnetic material 402 could damage magnetic material 402. Additionally, a very thin (1 nm to 3 nm) seed layer can be utilized, avoiding overgrowth and edge effects. Because the grain boundaries (e.g., non-magnetic material 404) can be very thin, patterned media 200 also has a greater effective area contributing to the bit signal over other patterned media fabricated according to previous methods. Thus, the utilization factor of patterned media 200 compares favorably with the density of continuous perpendicular magnetic recording media, while mitigating the superparamagnetic effect typically found on continuous perpendicular magnetic recording media.

Figure 5:
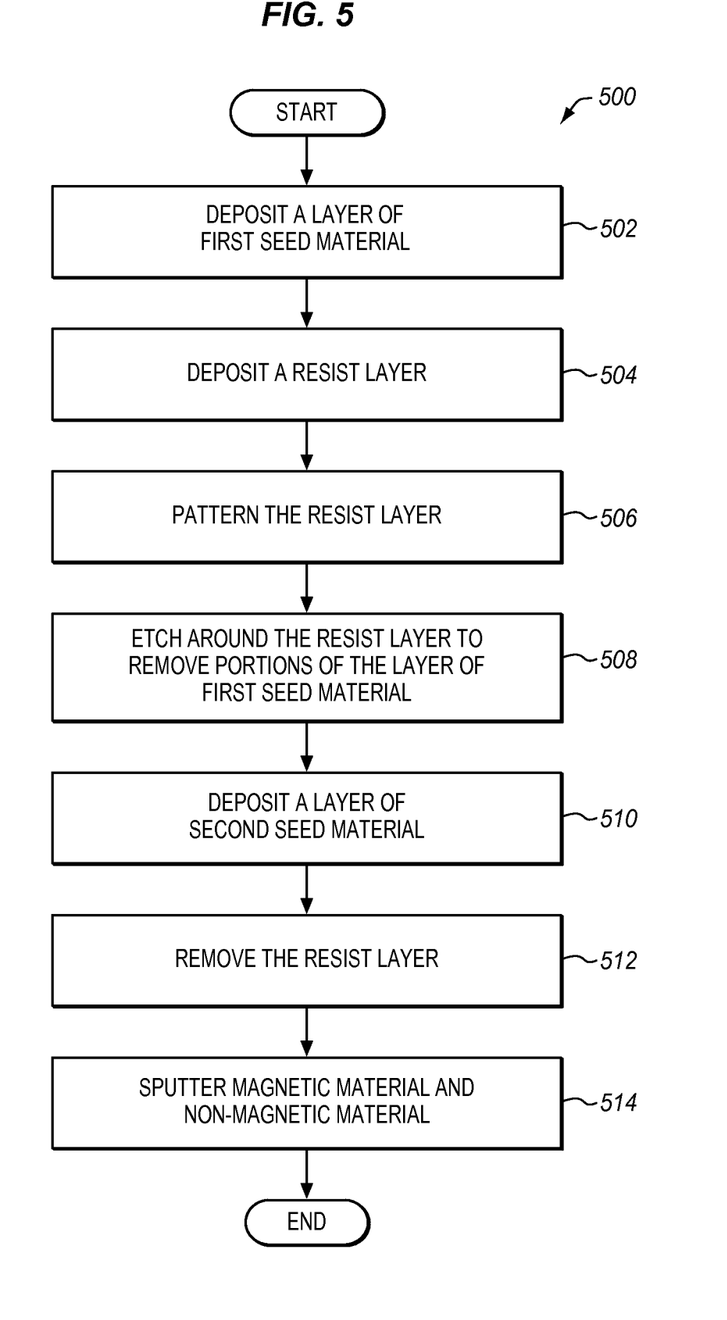
FIG. 5 illustrates a more detailed flow chart of fabricating patterned media in an exemplary embodiment of the invention.

FIG. 5 illustrates a more detailed flow chart of another method 500 for fabricating patterned media in an exemplary embodiment of the invention. FIGS. 6-12 illustrate cross sectional views of patterned media 600 during fabrication according to method 500 of FIG. 5 in exemplary embodiments of the invention, and the steps of method 500 are described in reference to patterned media 600 of FIGS. 6-12. The steps of method 500 may not be all-inclusive, and may include other steps not shown for the sake of brevity.

Figure 6:
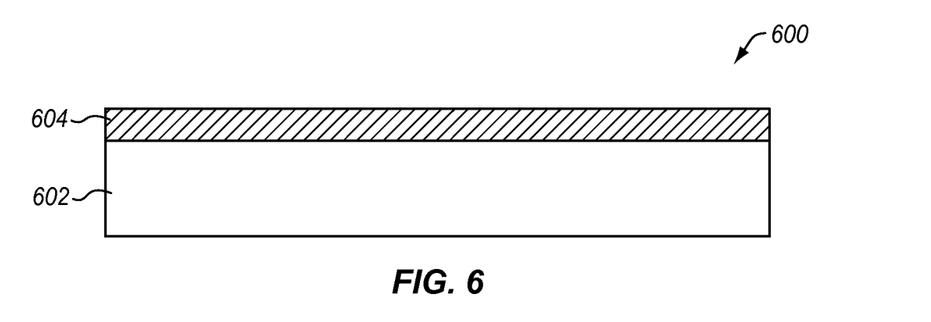
FIGS. 6-12 illustrate cross sectional views of patterned media during fabrication according to the method of FIG. 5 in exemplary embodiments of the invention.

Step 502 comprises depositing a layer of first seed material 604 (see FIG. 6) over a substrate 602. First seed material 604 is selected to initiate growth of subsequently formed magnetic material. For example, first seed material 604 may be selected so that a crystalline magnetic phase naturally prefers growing on subsequently defined islands or cells of first seed material 604. In this instance, first seed material 604 could be a strongly exchange coupled Co/Pt/Cr phase that triggers growth of a magnetic crystalline phase. First seed material 604 may also be selected to initiate growth of subsequently formed magnetic material based on chemical properties rather than crystalline properties. For example, first seed material 604 may be a Ru layer, which initiates growth of a CoPtCr recording layer. The resulting structure of patterned media 600 after completion of step 502 is illustrated in FIG. 6.

Figure 7:
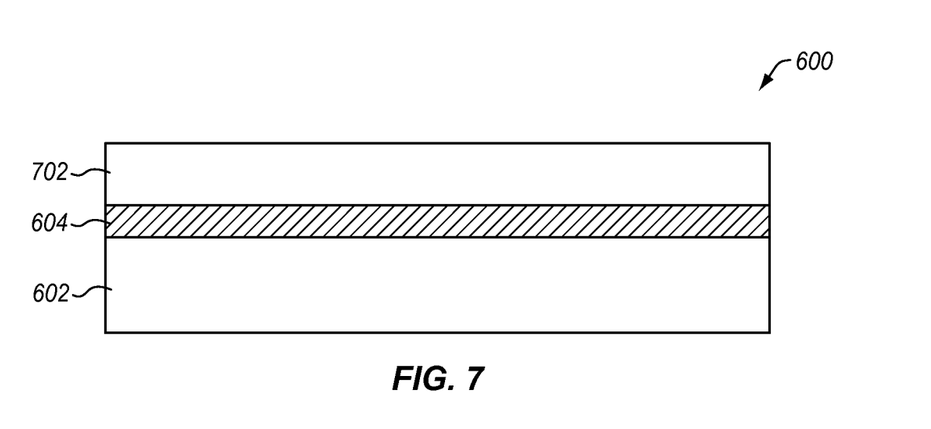
Figure 8:
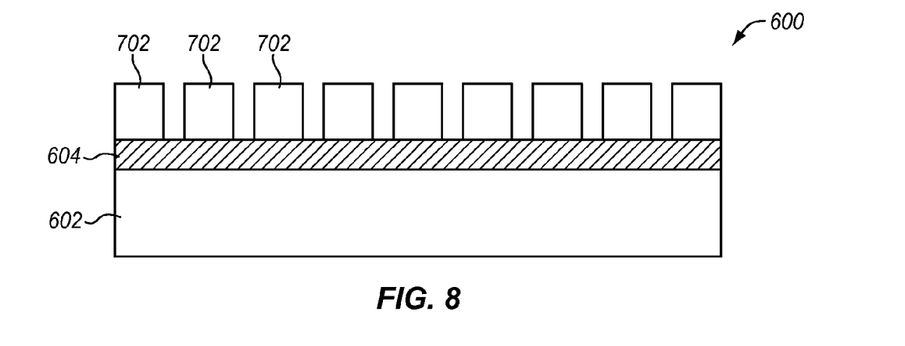

Step 504 comprises depositing a resist layer 702 (see FIG. 7). Step 506 comprises patterning resist layer 702. Resist layer 702 may be lithographically patterned using any lithographic process. Exemplary lithographic processes include: 1) nanoimprint lithography, 2) electron beam lithography, 3) x-ray lithography, 4) ultraviolet photolithography, and 5) extreme ultraviolet lithography, etc. Lithographic processes 2-5 may be performed using interference lithography or holography. Ultraviolet photolithography is typically performed utilizing a high index fluid between the final lens and the sample. Near field ultraviolet optical exposures are also possible. The radiation alters the chemistry of the resist selectively in the exposed areas. The difference in chemistry is transferred to a topological pattern in the resist. In nanoimprint lithography, a topographic imprint of a master is made and the resist base layer is etched. This is typically performed with reactive ion etching, but may also be performed using a wet chemical etch. In some cases, the surface of the radiation exposed resist may be reacted to form an etch resistant film in the pattern of the resist exposure. The pattern can be etched into the resist. In other resists, the sample with the seed layer and the exposed resist is placed in a solvent. The solvent will selectively dissolve either the exposed regions or the unexposed regions of the resist. The resulting structure of patterned media 600 after completion of step 506 is illustrated in FIG. 8.

Figure 9:
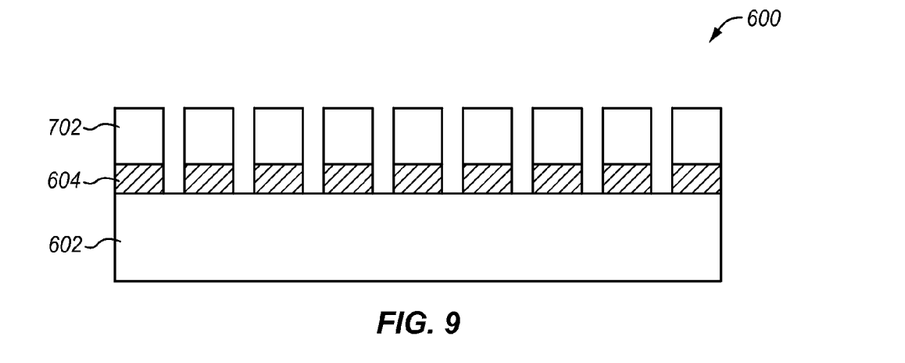

Step 508 comprises etching around resist layer 702 to remove portions of the layer of first seed material 604. The etching process defines islands of first seed material 604, with trenches separating each island of first seed material 604. Etching may be performed utilizing ion milling, reactive ion etching, other forms of ion etching, wet etching, etc. The etching process can be very shallow, and does not need to remove all of first seed material 604 in the trenches. The resulting structure of patterned media 600 after completion of step 508 is illustrated in FIG. 9.

Figure 10:
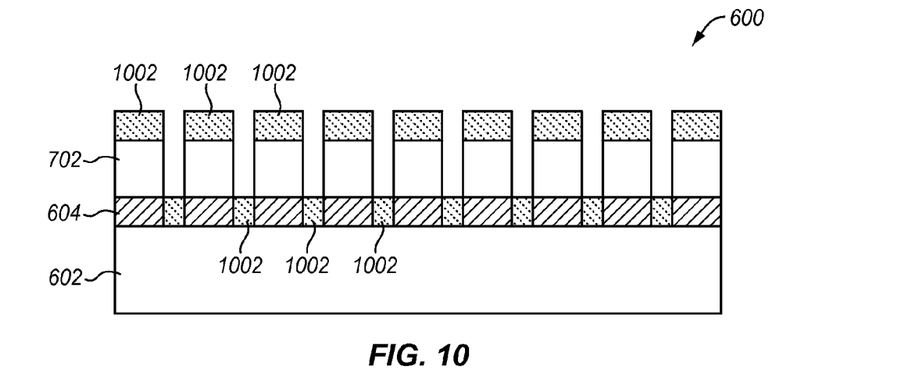

Step 510 comprises depositing a layer of second seed material 1002 (see FIG. 10). Second seed material 1002 is formed over resist layer 702, and in the trenches defined in step 508.

The thickness of second seed material 1002 is selected to screen underneath materials and control film growth above second seed material 1002. If the etching process of step 508 removes all of first seed material 604 in the trenches, then second seed material 1002 may be formed to a thickness substantially similar to the thickness of first seed material 604. Thus, a top surface of second seed material 1002 formed in the trenches may be substantially planar with a top surface of first seed material 604. Alternatively, if portions of first seed material 604 remain in the trenches, then second seed material 1002 may be formed to a thickness less than first seed material 604, such that a top surface of second seed material 1002 in the trenches is substantially planar with a top surface of first seed material 604.

Second seed material 1002 is selected to initiate growth of subsequently formed non-magnetic material. For example, second seed material 1002 may be TaOx or SiOx to initiate growth of an amorphous non-magnetic phase. The resulting structure of patterned media 600 after completion of step 510 is illustrated in FIG. 10.

Figure 11:
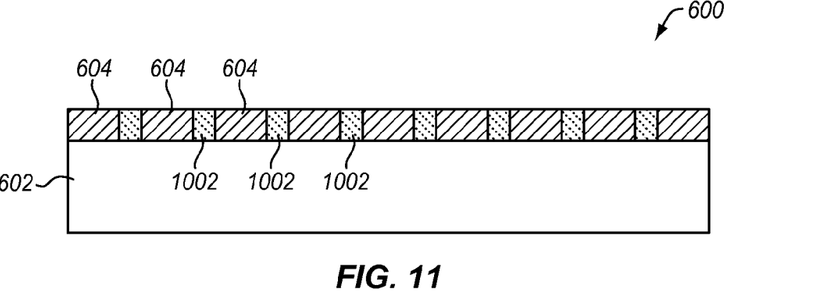

Step 512 comprises removing resist layer 702. Resist layer 702 may be removed using any standard lift-off process, such as stripping, ultrasonic agitation, spraying, chemical mechanical polishing (CMP), etc. The resulting structure of patterned media 600 after completion of step 512 is illustrated in FIG. 11.

Step 514 comprises sputtering magnetic material 1202 (see FIG. 12) and non-magnetic material 1204 onto first seed material 604 and second seed material 1002. Magnetic material 1202 grows on first seed material 604 and non-magnetic material 1204 grows on second seed material 1002. Magnetic material 1202 and non-magnetic material 1204 may be formed using other deposition processes, such as electroplating, chemical vapor deposition (CVP), atomic layer epitaxy (ALE) or molecular beam epitaxy (MBE). Both the magnetic and the non-magnetic material may be grown/deposited simultaneously to avoid any shadowing or overgrowth effects and to ensure a flat surface for proper aerodynamics so that no additional planarization steps are necessary. In any of these deposition processes, magnetic material 1202 prefers to grow on first seed material 604 and non-magnetic material 1204 prefers to grow on second seed material 1002. Thus, magnetic material 1202 and non-magnetic material 1204 form well defined columns of a matrix of islands of magnetic material 1202.

Figure 12:
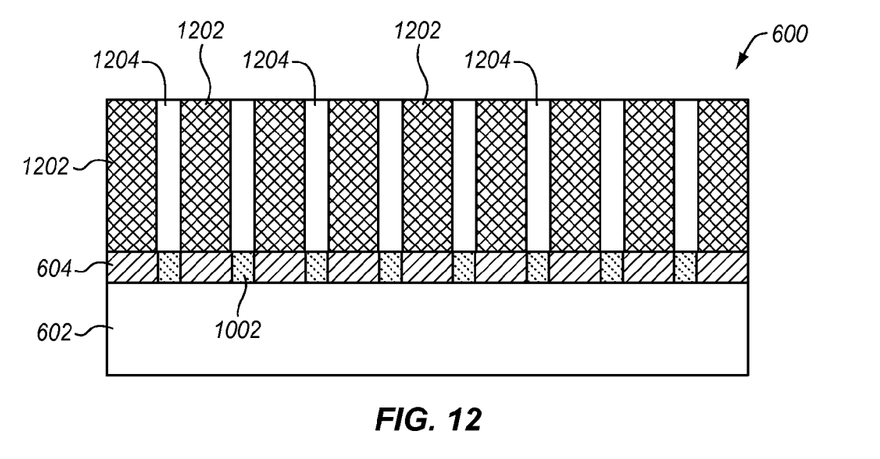

Exemplary combinations for magnetic material 1202 and non-magnetic material include cobalt and its alloys for magnetic material 1202 and oxides with elements, such as Si, Ta, V, B or Ti, for non-magnetic material 1204. CoPt, FePt and SmCo alloys may also be utilized as magnetic materials. Alternatively, non-oxide Co based alloys may also be utilized, including CoCr, CoCrPt, CoCrTb or CoCrPd alloys as well as CoPtB, CoPtCrB, or other CoPtXY alloys, with X and Y comprising B, Cr and Ta. These materials show phase segregation into Co-rich magnetic grains (e.g., magnetic material 1202) and non-magnetic grain boundaries (e.g., non-magnetic material 1204). The resulting structure of patterned media 600 after completion of step 514 is illustrated in FIG. 12.

Figure 13:
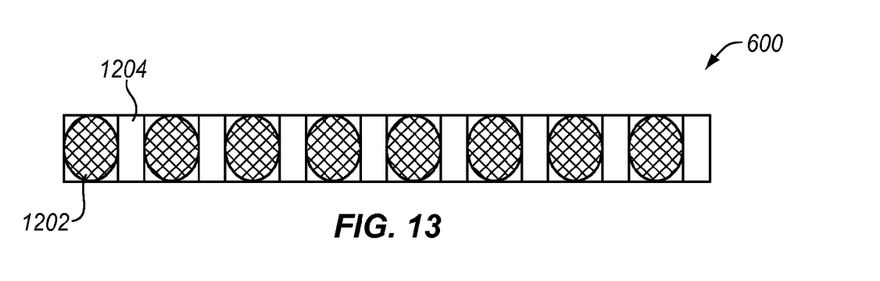
FIG. 13 illustrates a top view of patterned media fabricated according to the method of FIG. 5 with a single island of the matrix containing a single magnetic grain in an exemplary embodiment of the invention.

Patterned media 600 has a matrix of well-defined islands (or cells) of magnetic material 1202 separated by non-magnetic material 1204. In the best case, every island of first seed material 604 initiates growth of a single grain of magnetic material 1202 with a well-defined diameter corresponding to the dimensions of each island of first seed material 604. FIG. 13 illustrates a top view of patterned media 600 fabricated according to the method of FIG. 5 with a single island of the matrix containing a single magnetic grain of magnetic material 1202 in an exemplary embodiment of the invention. Each single grain of magnetic material 1202 switches independently from its neighbor units and corresponds to a single bit of patterned media 600. For the media growth process, the target composition may be tuned such that the natural average grain diameter of magnetic material 1202 and the grain boundary width match the dimensions of an island of first seed material 604 (i.e., the seed layer island diameter and island boundary widths).

Figure 14:
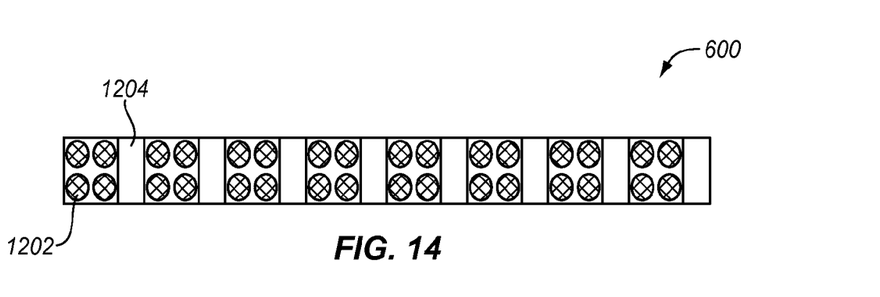
FIG. 14 illustrates a top view of patterned media fabricated according to the method of FIG. 5 with a single island of the matrix containing multiple aligned crystalline grains in an exemplary embodiment of the invention.

Alternatively, an island of magnetic material 1202 may contain several magnetic grains with a narrow natural grain size distribution. FIG. 14 illustrates a top view of patterned media 600 fabricated according to the method of FIG. 5 with a single island of the matrix comprising multiple magnetic grains of magnetic material 1202 in an exemplary embodiment of the invention. Each island of magnetic material 1202 may correspond to a single bit. Grains are aligned with respect to the boundaries of an island of first seed material 604. The boundaries of an island of first seed material 604 correspond to the transition boundaries, such that all of the grains corresponding with a bit are within the boundaries for the island. The coupling among grains in each island may be tuned by varying the cap layer. Strongly coupled grains will behave as a single independent magnetic domain. Advantageously compared with conventional continuous media, this structure reduces the signal to noise ratio because the transition is well defined, whereas in conventional continuous media, the transitions zigzag through the grain boundaries and yield larger transition noise, a dominant contributor to the read-back noise.

Further, different process variations are possible to fabricate patterned media 600. For example, forming the patterned seed layer can alternatively comprise forming a layer of second seed material on the substrate, forming a resist layer, patterning the resist layer, etching around the resist layer to remove portions of the layer of second seed material, and removing the resist layer. A sputtering process or other deposition process may then be utilized to grow magnetic material and non-magnetic material on the first and second seed materials. The patterned media formed according to this alternative process will be similar to patterned media 600 illustrated in FIG. 12.

Figure 15:
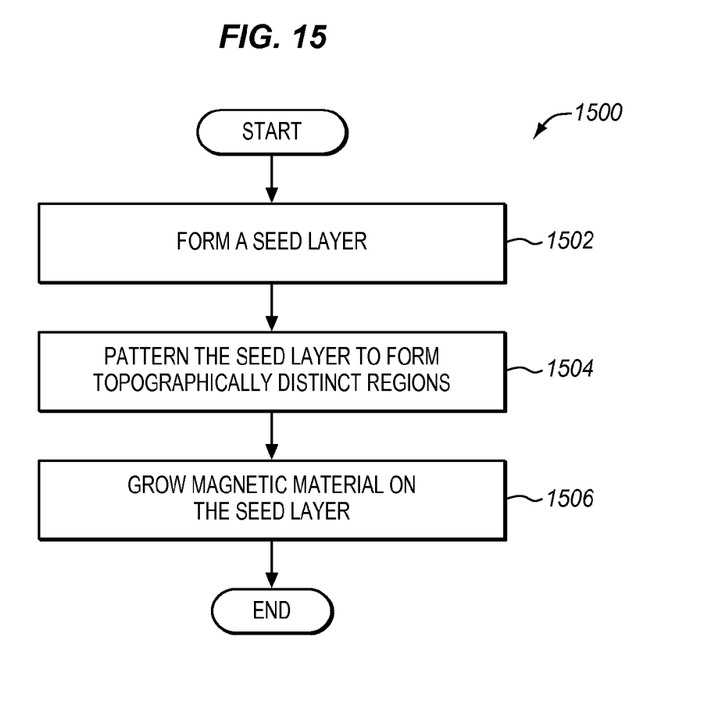
FIG. 15 illustrates a flow chart of a method for fabricating a perpendicular magnetic recording media for a magnetic storage device in an exemplary embodiment of the invention.

FIG. 15 illustrates a flow chart of a method 1500 for fabricating a perpendicular magnetic recording media for a magnetic storage device in an exemplary embodiment of the invention. FIGS. 16-22 illustrate cross sectional views of perpendicular magnetic recording media 1600 fabricated according to method 1500 of FIG. 15 in exemplary embodiments of the invention, and the steps of method 1500 are described in reference to perpendicular magnetic recording media 1600 of FIGS. 16-22. The steps of method 1500 may not be all-inclusive, and may include other steps not shown for the sake of brevity.

Figure 16:
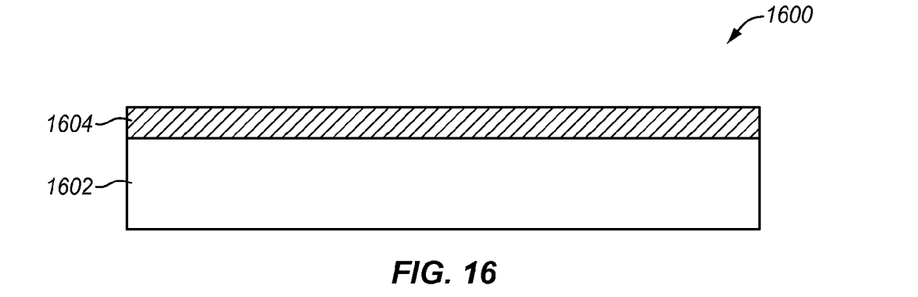
FIGS. 16-21 illustrate cross sectional views of the perpendicular magnetic recording media fabricated according to the method of FIG. 15 in exemplary embodiments of the invention.
Figure 17:
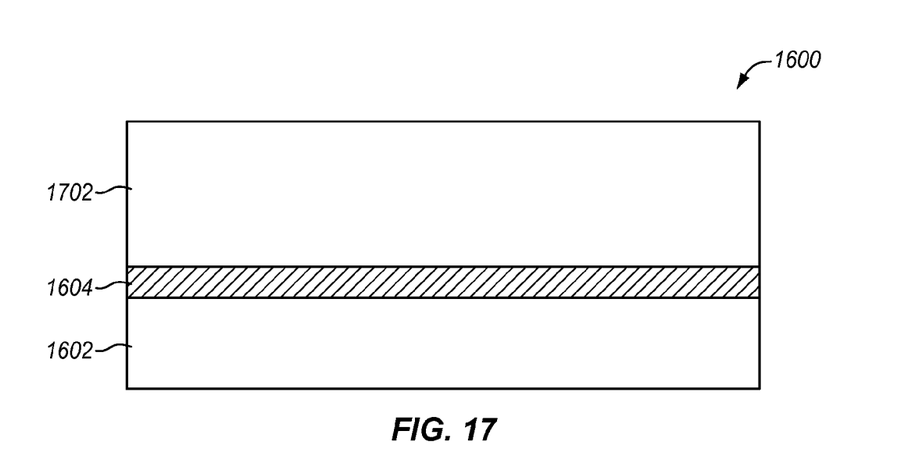

Step 1502 comprises forming a seed layer 1604 (see FIG. 16) over a substrate 1602. Seed layer 1604 may be selected to initiate growth of subsequently formed magnetic material. The resulting structure of perpendicular magnetic recording media 1600 after completion of step 1502 is illustrated in FIG. 16.

Figure 18:
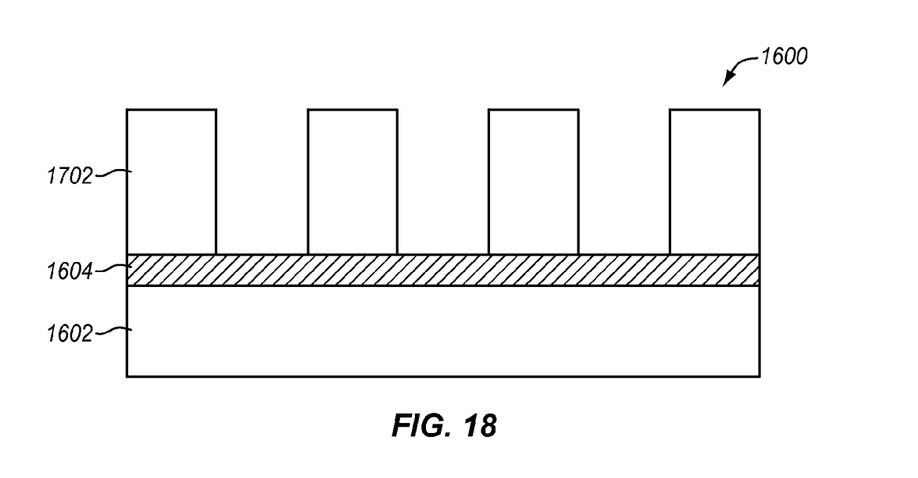

Step 1504 comprises patterning seed layer 1604 to form topographically distinct regions. First, a resist layer 1702 (see FIG. 17) is formed, and resist layer 1702 is patterned to form a matrix. Resist layer 1702 may be patterned using a photolithographic process. The matrix is defined of alternating exposed and un-exposed regions of seed layer 604. FIG. 18 illustrates the matrix of resist layer 1702.

Figure 19:
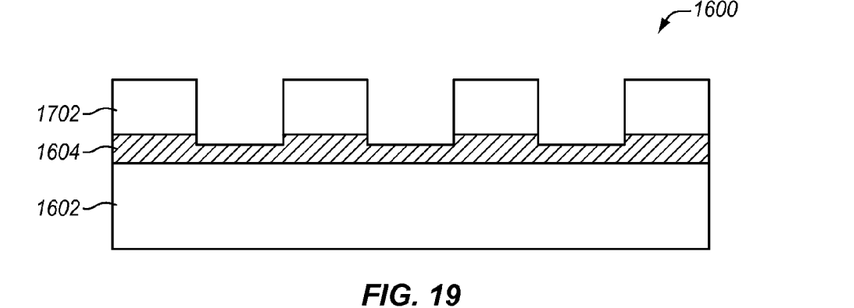
Figure 20:
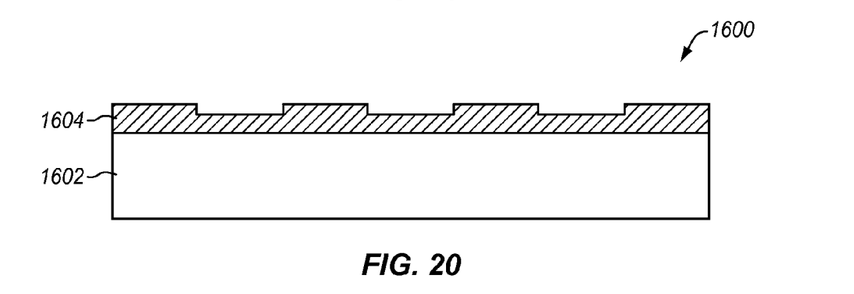

Next, seed layer 1604 is etched to lower a height of exposed portions of seed layer 1604 to form topographically distinct regions of seed layer 604. The height of seed layer 1604 may be between 1 nm and 3 nm, and the height of some regions of seed layer 1604 may be lowered between 1 nm and 2 nm. This topography is compensated for during the recording layer growth steps, which grow material having a thickness between 15 nm and 20 nm, and consequently no planarization process is necessary after forming the magnetic layer. The boundary between two topographically distinct regions forms a bit transition of perpendicular magnetic recording media 1600. FIG. 19 illustrates a seed layer after completion of the etching process. Resist layer 1702 is then removed by using a stripping or CMP process. The resulting structure of the seed layer after completion of 1504 is illustrated in FIG. 20.

Figure 21:
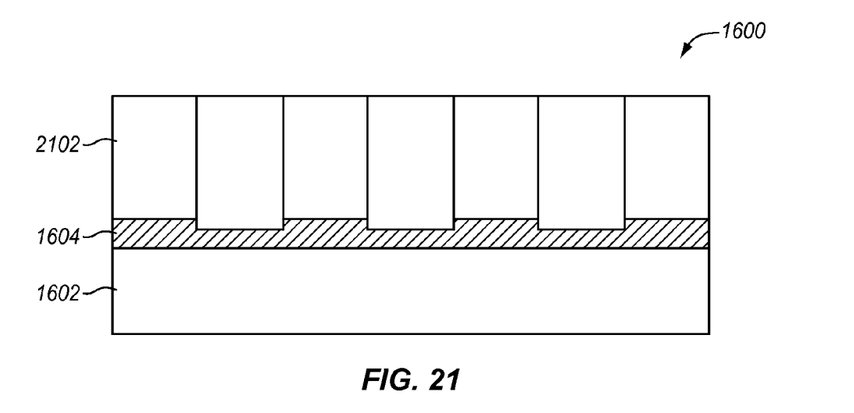

Step 1506 comprises growing magnetic material 2102 on seed layer 604. The resulting structure of perpendicular magnetic recording media 1600 after completion of step 1506 is illustrated in FIG. 21.

Figure 22:
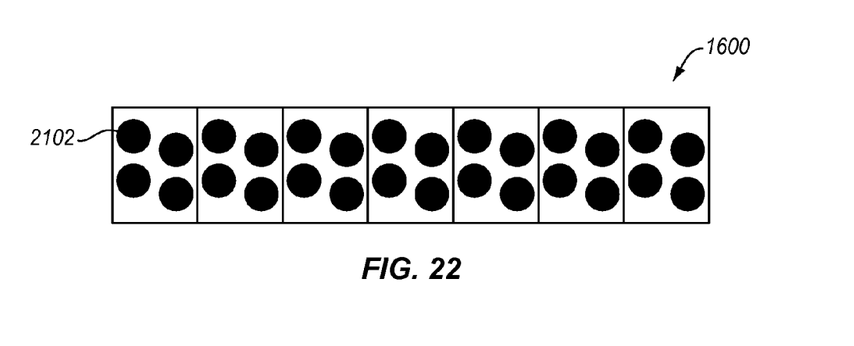
FIG. 22 illustrates a top view of the perpendicular magnetic recording media of FIGS. 16-21 fabricated according to the method of FIG. 15 with a single island of the matrix containing multiple aligned crystalline grains in an exemplary embodiment of the invention.

Because seed layer 1604 has topographically distinct regions, magnetic grains of magnetic material 2102 will grow within the boundaries of a topographically distinct region of seed layer 604, and won't cross a bit transition boundary. FIG. 22 illustrates a top view of perpendicular magnetic recording media 1600 fabricated according to the method of FIG. 15 in an exemplary embodiment of the invention. Because each grain of magnetic material 2102 is entirely within the boundaries of a single bit, this structure reduces the signal to noise ratio compared with conventional continuous media, because the transition is well defined whereas in conventional continuous media, the transitions zigzag through the grain boundaries and yield larger transition noise, a dominant contributor to the read-back noise.

Figure 23:
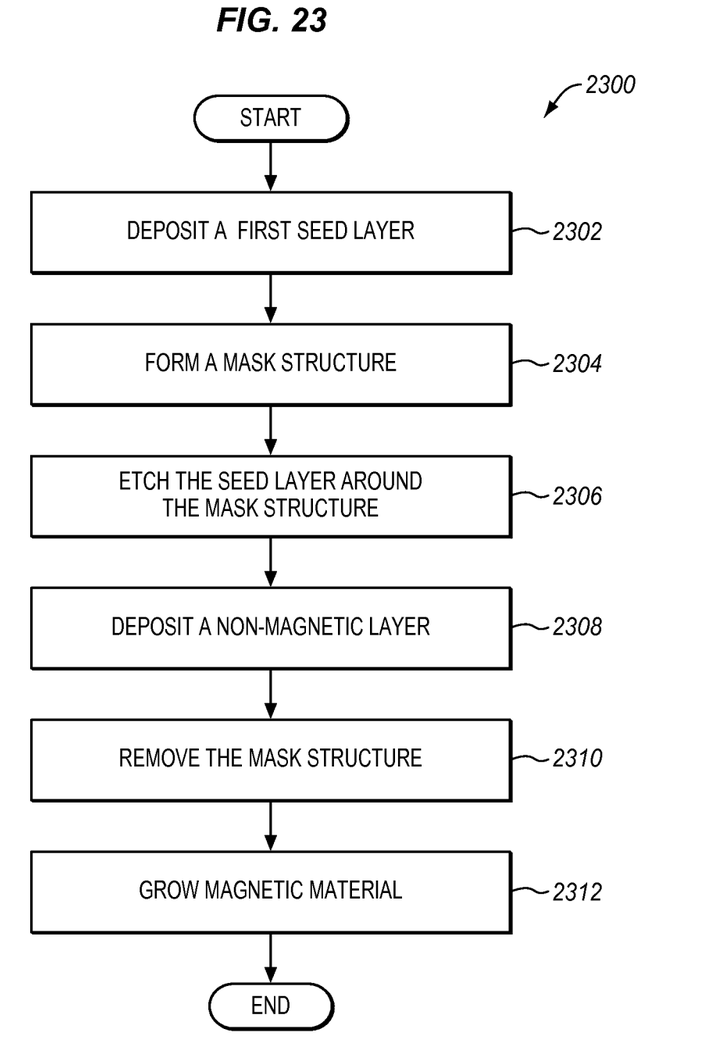
FIG. 23 illustrates a flow chart of a method for fabricating a perpendicular magnetic recording media for a magnetic storage device in an exemplary embodiment of the invention.

In another embodiment of the invention only a magnetic material may be grown selectively on a seed layer, and the non-magnetic material between the magnetic islands may be deposited rather than grown on a patterned seed layer. FIG. 23 illustrates a flow chart of a method 2300 for fabricating a perpendicular magnetic recording media for a magnetic storage device in an exemplary embodiment of the invention. FIGS. 24-28 illustrate cross sectional views of perpendicular magnetic recording media 2400 fabricated according to method 2300 of FIG. 23 in exemplary embodiments of the invention, and the steps of method 2300 are described in reference to perpendicular magnetic recording media 2400 of FIGS. 24-28. The steps of method 2300 may not be all-inclusive, and may include other steps not shown for the sake of brevity.

Figure 24:
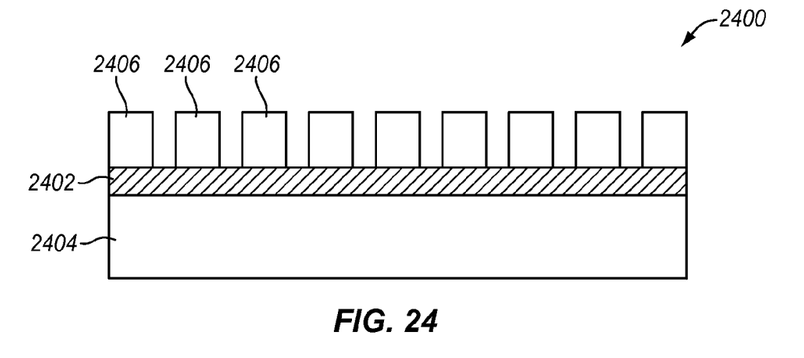
FIGS. 24-28 illustrate cross sectional views of a perpendicular magnetic recording media fabricated according to the method of FIG. 23 in exemplary embodiments of the invention.

Step 2302 comprises depositing a seed layer 2402 (see FIG. 24). Seed layer 2402 may be deposited over a substrate 2404 (see FIG. 24). Seed layer 2402 is selected to initiate growth of subsequently formed magnetic material. Step 2304 comprises forming a mask structure 2406 (see FIG. 24) over seed layer 2402. Mask structure 2406 may be formed in a photolithographic process similar to the process described in step 504 of FIG. 5. Mask structure 2406 defines a subsequently formed matrix of islands of seed layer 2402. FIG. 24 illustrates a cross sectional view of perpendicular magnetic recording media 2400 after completion of step 2304 in an exemplary embodiment of the invention.

Figure 25:
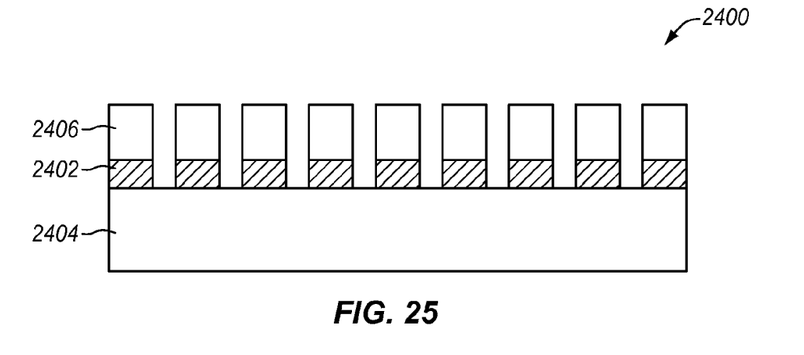

Step 2306 comprises etching seed layer 2402 around mask structure 2406 to form a matrix of islands in seed layer 2402. The etching process may be similar to the etching process described in step 506 of FIG. 5. FIG. 25 illustrates a cross sectional view of perpendicular magnetic recording media 2400 after completion of step 2306 in an exemplary embodiment of the invention.

Figure 26:
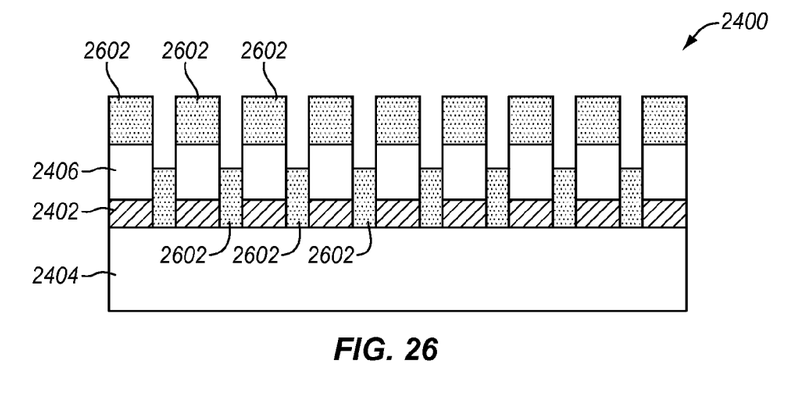

Step 2308 comprises depositing a non-magnetic layer 2602 (see FIG. 26). Exemplary materials for non-magnetic layer 2602 include oxides of the elements Si, Ta, V, B, Ti etc. As illustrated in FIG. 26, non-magnetic layer 2602 is deposited in the regions where seed layer 2402 was removed during the etching process of step 2306 (i.e., in the regions between the columns of mask structure 2406). Non-magnetic layer 2602 is deposited over mask structure 2406 and seed layer 2402 to a thickness of the desired magnetic media. In other words, a top surface of non-magnetic layer 2602 will correspond to a top surface of magnetic recording media 2400 FIG. 26 illustrates a cross sectional view of perpendicular magnetic recording media 2400 after completion of step 2308 in an exemplary embodiment of the invention.

Figure 27:
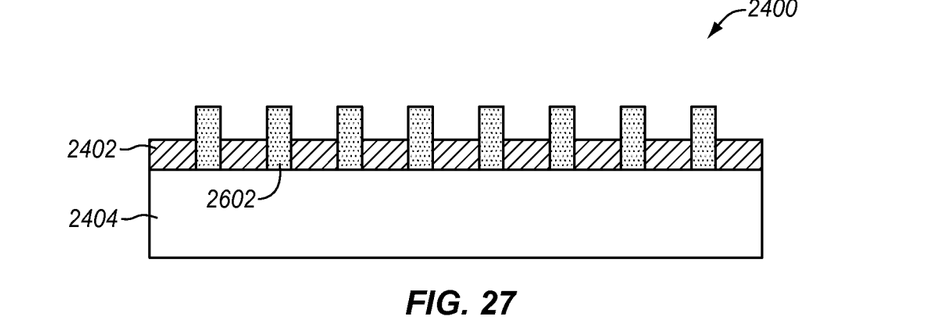

Step 2310 comprises removing mask structure 2406. Mask structure 2406 may be removed using any standard lift-off process, such as those described in step 512 of FIG. 5. FIG. 27 illustrates a cross sectional view of perpendicular magnetic recording media 2400 after completion of step 2310 in an exemplary embodiment of the invention.

Figure 28:
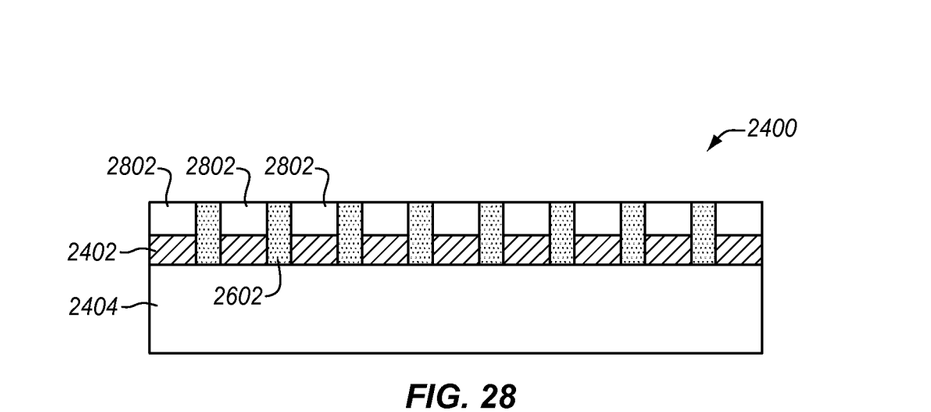

Step 2312 comprises growing magnetic material 2802 (see FIG. 28) on the matrix of islands of seed layer 2402. Magnetic material 2802 may be similar to magnetic material 1202 (see FIG. 12) described in reference to method 500 (see FIG. 5). Further, the growing process may be similar to the process described in step 514 (see FIG. 5) of method 500. Magnetic material 2802 may be deposited to a thickness such that a top surface of magnetic material 2802 is substantially planar with a top surface of non-magnetic layer 2602. FIG. 28 illustrates a cross sectional view of perpendicular magnetic recording media 2400 after completion of step 2310 in an exemplary embodiment of the invention.

All the media of this invention have the transitions defined lithographically. To write data successfully on these media, it is advantageous to have synchronized writing, i.e., aligning the train of write current precisely with the islands/transitions.

Although specific embodiments were described herein, the scope of the invention is not limited to those specific embodiments. The scope of the invention is defined by the following claims and any equivalents thereof.

We claim:

1. A method for fabricating a magnetic storage media, the method comprising:
   forming a seed layer;
   patterning the seed layer to form multiple substantially flat topographically distinct regions of the seed layer that each have a uniform height, where regions that are directly adjacent to each other have different heights from each other, wherein the height of each of the regions is measured from a base of the seed layer; and
   growing magnetic material directly on each of the topographically distinct regions of the seed layer, wherein bit transitions between portions of the magnetic material correspond with boundaries between the topographically distinct regions of the seed layer.

2. The method of claim 1, wherein the topographically distinct regions form a matrix.

3. The method of claim 1, wherein patterning the seed layer further comprises:
   forming a resist layer over the seed layer;
   patterning the resist layer; and
   etching around the resist layer to lower a height of exposed portions of the seed layer.

4. The method of claim 1, wherein a height difference between the topographically distinct regions of the seed layer is between about 1 nm and about 2 nm.

5. A patterned perpendicular magnetic media for a magnetic storage device, the perpendicular magnetic media comprising:
- a seed layer comprising:
  - a patterned matrix of solid islands of a first seed material that are vertically continuous through the seed layer and are formed directly on a substrate; and
  - a second seed material that forms solid regions that horizontally separate the matrix of islands of the seed layer, wherein the regions of second seed material are vertically continuous through the seed layer and are formed directly on the substrate, and wherein the first and second seed materials are different materials than the substrate;
- magnetic material grown on the first seed material; and
- non-magnetic material grown on the second seed material;
- wherein a surface defined by the magnetic material and the non-magnetic material is substantially planar.

6. The perpendicular magnetic media of claim 5, wherein a grain size of the magnetic material corresponds to a size of the islands.

7. The perpendicular magnetic media of claim 5, wherein each of the islands comprises multiple magnetic material grains of uniform size and the magnetic material grains are aligned with a bit transition between two islands.

8. A perpendicular magnetic media for a magnetic storage device, the perpendicular magnetic media comprising:
- a seed layer including multiple substantially flat topographically distinct regions that each have a uniform height, where regions that are directly adjacent to each other have different heights from each other, wherein the height of each of the regions is measured from a base of the seed layer; and
- magnetic material grown directly on each of the topographically distinct regions of the seed layer, where bit transitions between portions of the magnetic material correspond with boundaries between the topographically distinct regions of the seed layer.

9. The perpendicular magnetic media of claim 8, wherein a height difference between the topographically distinct regions of the seed layer is between about 1 nm and about 2 nm.

10. A method for fabricating patterned media, the method comprising:
- depositing a seed layer directly on a substrate, wherein the seed layer is a different material than the substrate;
- forming a mask structure, the mask structure defining a matrix of islands of the seed layer;
- etching the seed layer around the mask structure to form the matrix of islands of a first seed material, wherein the matrix of islands are vertically continuous through the seed layer and are formed directly on the substrate;
- depositing a second seed material, wherein the second seed material is a different material than the substrate;
- removing the mask structure, leaving regions of the second seed material that horizontally separate the matrix of islands, are vertically continuous through the seed layer, and are formed directly on the substrate;
- growing magnetic material on the matrix of islands of the first seed material; and
- growing non-magnetic material on the second seed material;
- wherein a surface defined by the magnetic material and the non-magnetic material is substantially planar.

11. The media of claim 5, wherein:
etched boundaries exist between the first seed material and the second seed material.

12. The media of claim 8, wherein:
an etched boundary exists between the topographically distinct regions of the seed layer.

* * * * *